United States Patent [19]

Popper

[11] 4,141,074

[45] Feb. 20, 1979

[54] ELECTRONIC WRIST CALCULATOR

[76] Inventor: Michael Popper, Sokolov St. 3, Jerusalem, Israel

[21] Appl. No.: 828,688

[22] Filed: Aug. 29, 1977

[30] Foreign Application Priority Data

Aug. 27, 1976 [CH] Switzerland .................. 10806/76

[51] Int. Cl.² .................. G06F 3/02; G06F 15/02
[52] U.S. Cl. .................. 364/705; 200/5 A; 364/709
[58] Field of Search .................. 364/705, 709; 340/365 R, 365 S; 200/5 A; 58/23 BA; 224/4 A, 4 B, 4 E, 4 F

[56] References Cited

U.S. PATENT DOCUMENTS

| 3,803,834 | 4/1974 | Reese | 364/705 X |
| 3,928,960 | 12/1975 | Reese | 364/705 X |
| 3,940,758 | 2/1976 | Margolin | 200/5 A X |
| 3,971,206 | 7/1976 | Martino | 224/4 D X |
| 3,973,706 | 8/1976 | Boyce et al. | 224/4 E X |

Primary Examiner—Jerry Smith
Attorney, Agent, or Firm—Sughrue, Rothwell, Mion, Zinn and Macpeak

[57] ABSTRACT

Individual planar enjoined links of a flexible wristband carry one or more manually operable keys, thereby defining a miniature keyboard array for a solid state wrist calculator. One or more of the links may carry a wrist watch battery for powering the calculator.

3 Claims, 5 Drawing Figures

ELECTRONIC WRIST CALCULATOR

BACKGROUND OF THE INVENTION

Recently, electronic watches have come into vogue incorporating calculator means having an electro-optical digitial display with the calculator constituted by integrated circuitry permitting the wrist watch to not only provide instantaneous time display but permit calculating operation. U.S. Pat. No. 3,803,834 teaches such combined wrist watch and wrist calculator.

The problem with such wrist watch calculators is not in the miniaturization of the components but in the manipulation of the calculator componentry by human hand. Technically and electronically, the watch and calculator industry has the ability to produce wrist watch calculator instruments as small as 1 square centimeter, essentially the volume of a single sugar cube. However, the display of the numbers requires a minimum of 2 square centimeters and, more importantly, the keyboard necessary to the hand operation of the calculator requires a minimum of 22 square centimeters for easy and comfortable operation. On the other hand, the size of the wrist watch or wrist calculator must be no larger than 3 centimeters in diameter and 7 square centimeters in terms of the face area of the watch or calculator face because a larger plate will not fit the normal person's wrist.

Therefore, in terms of U.S. Pat. No. 3,803,834 which mounts the keyboard to one face of the wrist watch or calculator case, the keys are of such a small size and the keyboard array is so reduced in size that it is almost impossible to operate the keys individually, and certainly such operation is neither easy or comfortable. Based on the limitations in watch case surface area of the face bearing the instrumentation and display, a minimum of 24 square centimeters is needed in terms of the display and keyboard requirements, but the surface of a conventional size watch or calculator case offers only 7 square centimeters, thus lacking 16 square centimeters or approximately 2¼ watch surfaces. In terms of the reference U.S. Pat. No. 3,803,834, a combined wrist watch and mini-calculator of that patent constitutes an essentially useless toy rather than a practical instrument.

It is therefore a principle object of this invention to provide a wrist calculator or combined wrist watch and wrist calculator in which the keyboard permits easy and comfortable operation as provided by an available surface area of the watch without compromising the surface area of the case required for display purposes.

It is a further object of this invention to provide an improved wrist calculator in which the wristband incorporates both the calculator keyboard and the batteries for powering the calculator componentry.

It is a further object of this invention to provide an improved wrist calculator in which the wristband may be separated to facilitate access to the keyboard defined by the wristband and to facilitate keyboard operation after removal of the wrist calculator from the wrist of the user.

SUMMARY OF THE INVENTION

The present invention is directed to a wrist calculator of the type which includes a generally planar wrist case having opposed faces and opposite ends, a wristband coupled to respective ends of the wrist case and forming a closed loop, electronic calculator means carried by said case, and which further has an electrical optical display means within one face thereof for optically displaying data during calculator use. The wrist calculator further comprises battery means and calculator keyboard means and manually operable calculator keyboard means for controlling operation of the calculator means. The improvement resides in the band comprising flexibly joined links with the calculator keys being carried by individual links and switch means within the links and responsive to depression of the keys for controlling the calculator means within the wrist case.

Preferably, a pair of keys is carried by each link in side-by-side fashion, with the planar links being of rectangular configuration and flexible cable means carried on the rear face of the wristband defined by the links, mechanically connected to the links. The cable means includes means for connecting individual cable conductors of the cable means to the switch means, with the conductors extending from the switch means to the wrist case. At least one of said links preferably carries, internally, a battery which is also cable connected to the wrist case carried calculator means. A detachable coupling may be incorporated between a given pair of links for permitting the watchband to be separated into two portions facilitating the placement of the wrist calculator and wristband face up on a horizontal surface for facilitating calculator use.

DESCRIPTION OF THE PREFERRED EMBODIMENTS

Figure 3:
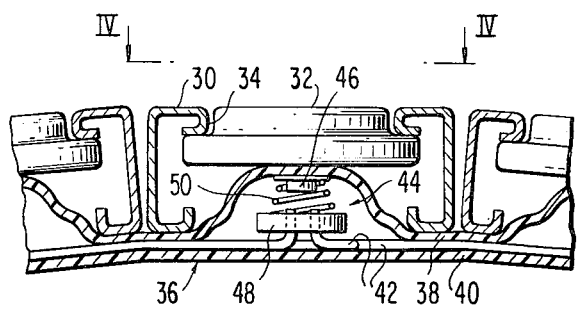
FIG. 3 is a vertical sectional view of a portion of the wristband taken about line III—III of FIG. 1.
Figure 1:
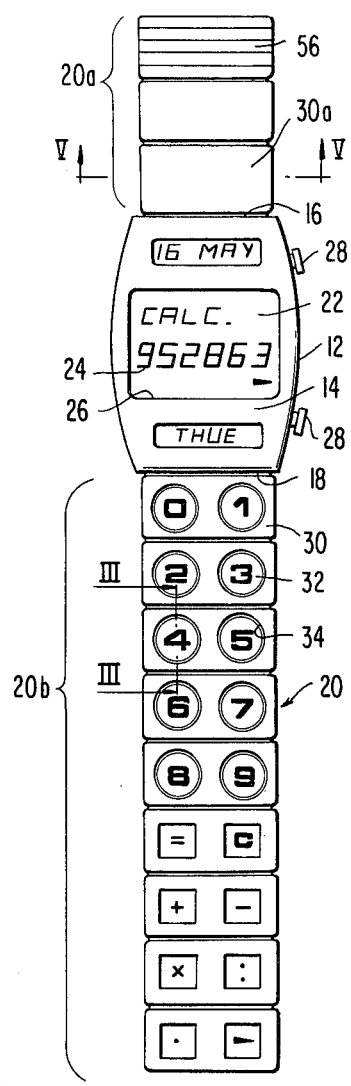
FIG. 1 is a top plan view of the improved wrist calculator and flexible wristband of the present invention with the wristband unlatched and separated, and the keyboard and electro-optical display face up for manual operation of the keyboard.
Figure 4:
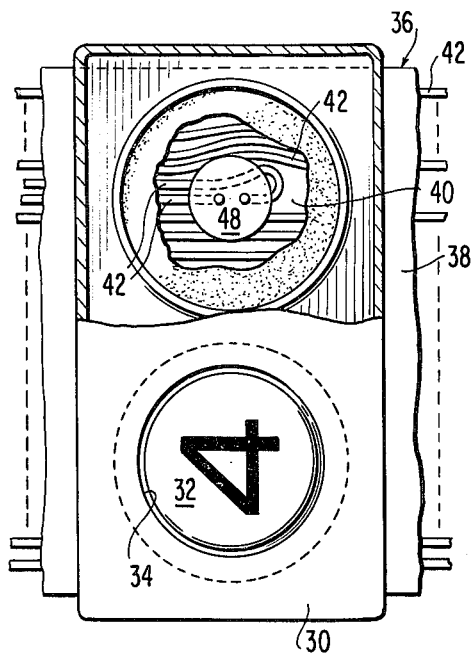
FIG. 4 is a top plan view, partially in section, of a portion of the wristband of FIG. 3 taken about line IV—IV.
Figure 2:
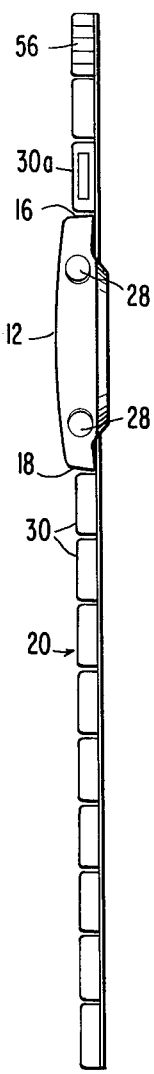
FIG. 2 is a side elevational view of the wrist calculator of FIG. 1.
Figure 5:
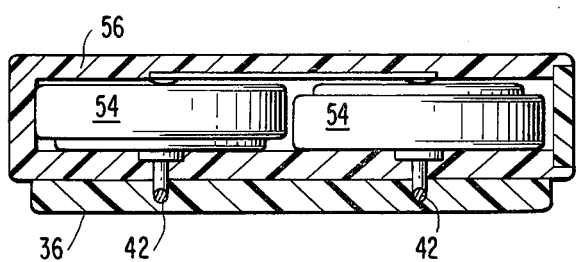
FIG. 5 is a sectional view of a portion of the wristband of FIG. 1 taken about line V—V showing the linkmounted battery for the wrist calculator.

Referring to the figures, there is shown an improved wrist calculator constituted principally by a generally planar, metal wrist case 12 having an upper face 14, opposed ends 16 and 18. End 16 bearing a first portion 20a of a wristband indicated generally at 20 while a second portion 20b of the wristband is mechanically coupled to the opposite end 18 of the wrist case 12. In a similar fashion to U.S. Pat. No. 3,803,834, the wrist calculator of the present invention incorporates within the case 12 calculator means including an electrical electro-optical display means as at 22, displaying as shown, a 6-digit numeral array 24 within a rectangular display opening 26. "On-off" control knobs 28 are employed for appropriately controlling the calculator means in addition to keyboard means which constitutes the novel aspect of the present invention. The wristband 20 is composed of a plurality of links as at 30 which are of essentially rectangular, planar form and provide for flexibility of the band 20 by being edge or end connected. For band section 20b, the first five links 30 from case 12 constitute a 10-digit keyboard, each link 30 housing a pair of keys as at 32, the keys 32 being generally circular in form, and being mounted within openings as at 34, FIG. 3, within the links 30 on the upper or front face 38, FIG. 1. The individual links 30 may be joined mechanically by means (not shown), and in the illustrated embodiment, flexible cable indicated generally at 36 are mounted to the underside or rear of the wristband 20, the cable means constituted by outer layers of insulative material as at 38 and 40, and carrying internally conductors as at 42 which are connected to switch means indicated generally at 44 for each of the keys. The switch means 44 may constitute spaced apart switch members 46 and 48 being normally maintained out of contact with each other by means of a resilient member, such as spring 50. The conductors 42 have portions whose ends terminate within member 48. Member 46 is conductive and acts as a movable contact, and when the key 32 is depressed within its link 30, it causes the movable contact 46 to complete a circuit across the ends of the conductors 42 within member 48. The cable 36 extends the complete length of the band sections 20a and 20b and being joined appropriately to the calculator means within case 14, the keys and the links may be appropriately formed of metal since the plastic insulation layer 38 effectively insulates the links and the keys from the switch means 44. Preferably, one of the two links 30 which are coupled to each other and by way of one of the links to case 12 at the upper end 16 of the case carries individual electrical watch batteries 54. The batteries may be embedded in plastic insulation material 56 defining link 30a which electrically insulates the batteries from the metallic links 30 of the wristband. Appropriately, the electrical cable 36 includes conductors as at 42 for connecting the batteries in series or in parallel as desired with the cable underlying the links 30, FIG. 1, and extending between the batteries and the calculator means within casing 12. A lockable coupling 56 is provided at the end of watchband section 28 and permits the detachable coupling of the battery carrying band section, with the outermost link 30 of band section 20b. Certain of the links of the band section 20b carry keys 32 for performing calculation functions upon their depression, such as addition, subtraction, multiplication, etc. in conventional fashion.

In operation, in accordance with such calculators, depression of the keyboard keys 32 causes the calculator means within casing 12 to perform a desired operation or operations with the output being provided by the display means 22. By way of the switch means internally of the cable means, the keyboard is essentially dustproof and waterproof.

While the invention has been particularly shown and described with reference to preferred embodiments, it will be understood by those skilled in the art that the foregoing and various changes in form and details may be made therein without departing from the spirit and scope of the invention.

What is claimed is:

1. In a wrist calculator comprising a generally planar wrist case having opposed faces and opposite ends, a flexible wristband coupled to respective ends of said wrist case, electronic calculator means carried by said case, and including electro-optical display means on one face thereof for optically displaying data during calculator use, battery means for energizing said calculator means and manually operable calculator keyboard means for controlling operation of said calculator means, the improvement wherein:

said wristband comprises flexibly joined links and said keyboard means comprises keys carried individually by said links and switch means carried by said links and actuated by said keys, means for electrically connecting said switch means and said battery means to said calculator means, and wherein said keys are of a height generally equal to the height of the links to form single transverse rows on said links and to thereby maximize key area per link to facilitate keyboard operation of the wrist calculator.

2. The wrist calculator as claimed in claim 1 wherein said links are of planar, rectangular configuration, and said keys are carried on the face of said links corresponding to the face of said case carrying said display means, and cable means extend between said links, being mechanically connected thereto, and including conductor means for connecting said switch means to said calculator means of said case.

3. The wrist calculator as claimed in claim 2 wherein said cable means comprises inner and outer plastic layers, and said switch means comprises spring biased normally spaced contact means connected to said conductor means and interposed between said insulative said plastic layers, and underlying a depressible key.

* * * * *